M. AND H. W. AXELMAN.

BRIEF AND OTHER CARRYING CASE.

APPLICATION FILED MAR. 31, 1921.

Reissued May 17, 1921.

15,104.

3 SHEETS—SHEET 1.

Witnesses

J. W. Angell

Charles W. Ricks

Inventors

Mayer Axelman

Harry H. Axelman by Charles W. Ricks Atty.

M. AND H. W. AXELMAN.

BRIEF AND OTHER CARRYING CASE.

APPLICATION FILED MAR. 31, 1921.

Reissued May 17, 1921. 15,104.

3 SHEETS—SHEET 2.

Witnesses

J. W. Angell

Charles W. Nellis

Inventors

Mayer Axelman

Harry H. Axelman by Charles W. Nellis Atty.

M. AND H. W. AXELMAN.

BRIEF AND OTHER CARRYING CASE.

APPLICATION FILED MAR. 31, 1921.

Reissued May 17, 1921.

15,104.

3 SHEETS—SHEET 3.

Witnesses

J. W. Angell

Charles Gillespie

Inventors

Mayer Axelman

Harry H. Axelman

By Charles Gillespie Atty.

UNITED STATES PATENT OFFICE.

MAYER AXELMAN AND HARRY W. AXELMAN, OF CHICAGO, ILLINOIS.

BRIEF AND OTHER CARRYING CASE.

15,104. Specification of Reissued Letters Patent. Reissued May 17, 1921.

Original No. 1,329,574, dated February 3, 1920, Serial No. 307,244, filed June 27, 1919. Application for reissue filed March 31, 1921. Serial No. 457,492.

*To all whom it may concern:*

Be it known that we, MAYER AXELMAN and HARRY W. AXELMAN, citizens of the United States, and residents of the city of Chicago, in the county of Cook and State of Illinois, have invented certain new and useful Improvements in Brief and other Carrying Cases; and we do hereby declare that the following is a full, clear, and exact description of the same, reference being had to the accompanying drawings, and to the numerals of reference marked thereon, which form a part of this specification.

This invention has general reference to brief and other carrying cases; and it consists, essentially, in the novel and peculiar combination of parts, and details of construction, as hereinafter first fully set forth and described, and then pointed out in the claims.

The object of this invention is the production of an efficient and serviceable carrying case in which the usual tying straps by which the case is tied, are placed out of sight, so that they, and especially the ends of the straps are hidden in the case. It is a well-known fact that in all carrying cases such as suit cases, satchels, carrying bags, and the like, which are provided with straps secured to the case, these straps are objectionable features. They dangle about; the ends thereof are liable to catch on objects; the exposed buckles are liable to injure persons coming in contact therewith, and speaking in general terms, they are a necessary nuisance.

To overcome this objectionable feature, we construct this carrying case in such a manner that the straps are located in the interior of the case.

Another object of this invention is the introduction therein of a resilient, preferably metallic frame, to form the central portion of the case, which imparts to the whole structure a degree of stiffness and substantiality which can not be found in similar existing structures.

Other objects of this invention will hereinafter fully appear.

In the drawing forming a part of this specification and which illustrate the preferred embodiments of our invention—

Like parts are designated by the same characters and symbols of reference in all the various figures.

This carrying case is a substantially rectangular structure, constructed of any suitable material, preferably leather, and it comprises a front wall A, a rear wall B, which latter wall is extended beyond the height of the front wall to afford a flap or fly C, which is adapted to fold over the front wall A to serve as a closure to the case, there being on this fly suitable snap fastenings D, or other means for holding the fly to the case, and a lock E, for locking the same. These two members A, B, are placed in spaced-apart relationship, there being between these walls, two partitions 12, 13, to divide the interior of the case into three compartments 14, 15, 16.

Figure 5:
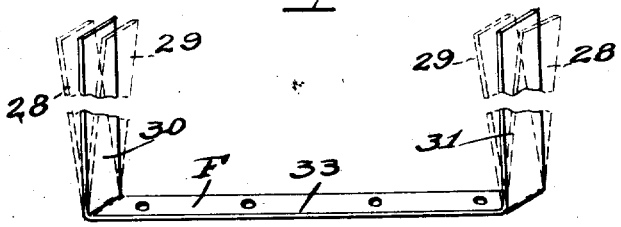
Fig. 5 is a perspective view of the metallic frame employed in this case.

The medial one, 15, of these compartments is formed by a U-shaped, preferably metallic, frame F, shown detached, and without any covering, in Fig. 5. The compartments 14 and 16 are formed by connecting the front and rear walls to the partitions 12, 13, by side gussets or accordion plaits 17, 17ª, 18, 18ª, and bottom gussets 19, 20, whereby the case is rendered extensible to a degree limited by the accordion plaits of which there may be any desired number to afford the desired carrying capacity of the case.

In order to tie the case, there are provided a multiplicity of straps, G, preferably leather, one end of which is preferably sewed to the inner side of the wall A, near the lower margin thereof, by stitching 21, and then passed out of the compartment 14 underneath the bottom of the case, and either into the compartment 16 where they may be secured to the walls thereof or into the pocket formed by the facing 23 on the outer surface of the rear wall B, as illustrated in Figs. 2, 3, 4 and 9.

Upon the back of the member B of the case there is located a pocket H, which comprises the facing 23, which is turned inwardly at its lower margin, as at 24, and there stitched to the back B. This facing is connected at its vertical margins to the back B by gussets 25, whereby the pocket H may be extended to the limit of the gussets 25. Above the upper margin of the pocket facing 23 there is secured to the back B a fly or flap I, the inner longitudinal margin of which is stitched to the back as at 26. This fly I overlies the facing 23 of the pocket, and has near its margins snap-fasteners or other catches 27. It is in this pocket in which the ends of the straps G, and the buckles 22 which secure them are located so that when the fly I is turned down, the straps are hidden in the pocket H, but may be manipulated by lifting the fly I and reaching into the pocket.

Figure 9:
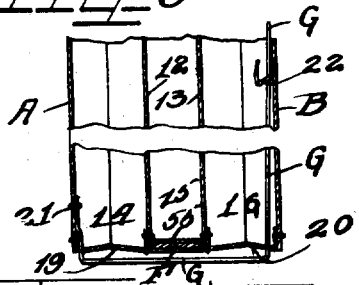
Fig. 9 is a view similar to Fig. 7, showing the tie-strap and its buckle when located in the compartment 16 instead of the pocket at the back of the case.

It is desirable that in some cases the pocket at the back of the case be dispensed with. In this instance, we pass the straps G into the compartment 16, as illustrated in Fig. 9, and secure the buckles 22 to the inner side of the back B. The straps, in this case are reached by reaching into the pocket or compartment 16.

Figure 1:
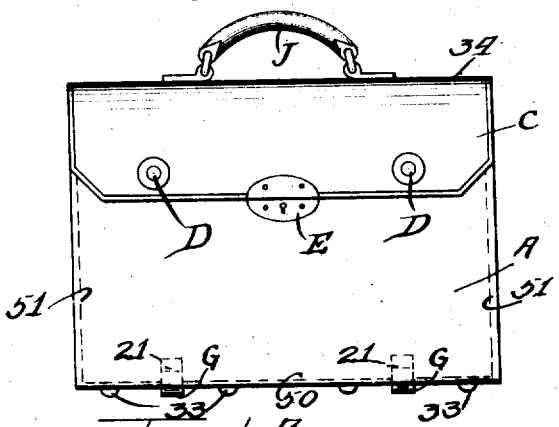
Figure 1 is a front elevation of this carrying case.
Figure 2:
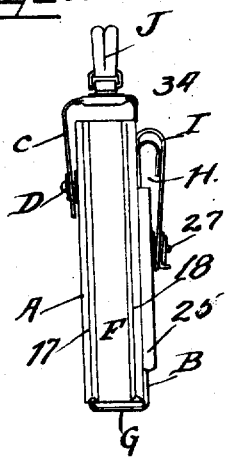
Fig. 2 is an end elevation of the same.
Figure 3:
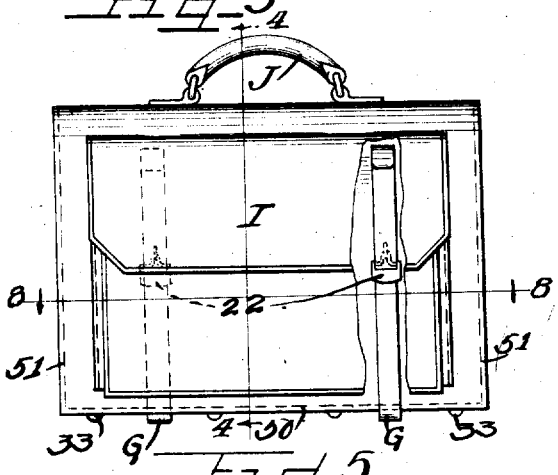
Fig. 3 is a rear elevation of the case, a portion of the pocket on the back of the case being broken away to disclose one of the tie straps and its buckle.
Figure 4:
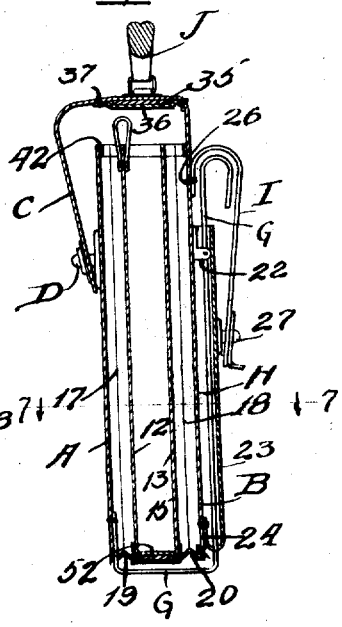
Fig. 4 is a sectional elevation on line 4—4 of Fig. 3; this figure as well as several others of the remaining figures being drawn on an increased scale.
Figure 10:
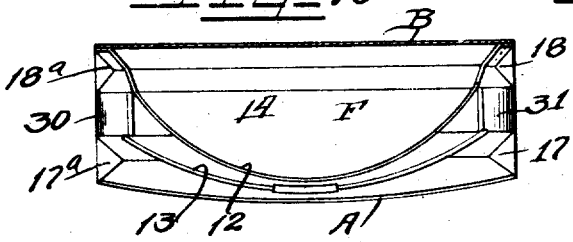
Fig. 10 is a plan view of the case, the flap or fly C being omitted, the back B being shown in section.

We have hereinbefore mentioned the metallic, U-shaped frame F. This frame is a flat bar which is best made of steel to be resilient; and it is covered on its outside and inside with any suitable material, such as leather, canvas, cloth, and the like, and it is to this outside covering that the inner margins of the gussets are secured, as will hereinafter appear. Originally, the two limbs 30, 31, of the frame F are at an obtuse angle to the base 32 of the frame, as shown in dotted lines at 28, in Fig. 5, and these limbs are then pulled into parallelism when the partitions 12, 13, are sewed thereto. This places the partitions in tension; but when these partitions are being distended or deflected, as illustrated in Fig. 10, the two limbs 30, 31, will be drawn toward each other, as indicated by the dotted lines 29, in Fig. 5, to regain their normal position when the partitions are released. The base of the frame F greatly stiffens the bottom of the carrying case and prevents its bulging outwardly when weight is carried in the case. Buttons 33, Figs. 1, 3, and 6, are placed under the base 32, upon which the case may rest when placed in vertical position on the floor, table, or other object.

Figure 6:
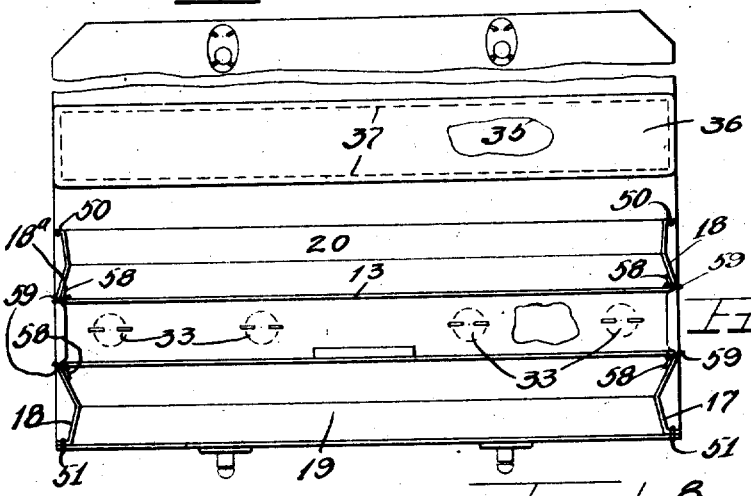
Fig. 6 is a plan view of the case when fully extended, the tying straps not being visible.
Figure 11:
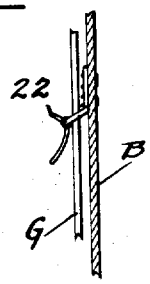
Fig. 11 is a side view of a portion of the tie-strap, its buckle, and a part of the back of the casing.
Figure 12:
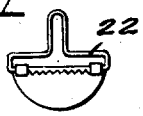
Fig. 12 is a front elevation of the buckle detached.
Figure 7:
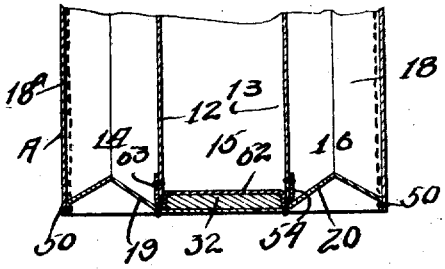
Fig. 7 is a transverse sectional elevation of the lower part of the case, on line 7—7 of Fig. 4, the tie-straps and the back pocket being omitted.

The normally horizontal portion 34 of the fly C is reinforced by a preferably fiber or veneer strip 35, which is held in position by a leather or other strip 36, sewed along the marginal edges of the said strip as at 37, Fig. 6. This reinforcing of the fly C strengthens the carrying case so that when carried by a handle J, suitably secured to the fly and its reinforcing strip, this reinforced portion of the case will resist upward bending caused by the weight in the case.

Figure 8:
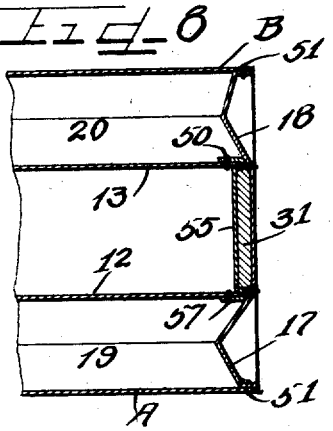
Fig. 8 is a longitudinal sectional plan of the lower part of the case on line 8—8 of Fig. 3, the tie-straps and pocket omitted.

Attention is now invited to the fact that the outside covering of the U-shaped frame F, and the six gussets or accordion plaits 17, 17ª, 18, 18ª, 19, and 20, are all formed of a single piece of flexible material, such as leather, canvas, cloth, and the like, folded in such manner that the gussets are integrally connected. Thus a strip of this material, slightly wider than the carrying case when in fully-extended condition, and as long as necessary to go around the bottom and two sides of the case, is first folded upon itself along the longitudinal margins as indicated by the lines 40, 40ª, and then longitudinally along the lines 41, 41ª, and again longitudinally on the lines 49, 49ª, This strip is then twice folded crosswise at 43, 43ª, a distance from its end margins 42, 42ª, corresponding to the height of the case plus narrow end portions 44, 44ª. At the intersection of the folds 40, 41, 41ª, and 40ª, with the folds 43 and 43ª there are formed right-angled, triangular creases 45, 46, 47, 48, and 45ª, 46ª, 47ª, and 48ª, so that when the two end portions are turned at right angles and the strip refolded, the portions defined by the lines 43, 43ª, and the lines 40, 41, 41ª, and 40ª, form the two bottom gussets 19, 20, while the remaining portions of the strip form the four side gussets 17, 17ª, 18, and 18ª, the middle portion bounded by the longitudinal lines 41, 41ª, forming the outside covering for the members 30, 31, 32, of the U-shaped frame F. This outside covering is preferably cemented to the frame members and then the front A and back B are sewed to the margins of the gussets as at 50, 51, in Figs. 1, 3, 6, 7, and 8, so that there are two thicknesses of the material at the three margins of the front A, and also three thicknesses at the margin of the back member of the case. Before the front and the back members of the case are sewn to the gussets, the partitions 12, 13, are placed upon the bottom or base member 32 of the frame F, in the following manner:

A strip 52, of suitable material is placed upon, and preferably cemented to, the inner surface of the base member 32. This strip is wider than the base, as shown best in Fig. 7, its margins 53, 54, being turned upwardly and cemented, or otherwise secured to the lower edges of the partitions 12, 13. Similar strips 55, Fig. 8, are cemented to the inner surfaces of the limbs 30, 31, of the frame F, and passed around the vertical margins of the partitions 12, 13, as at 56, 57, and cemented or otherwise secured thereto.

Figure 13:
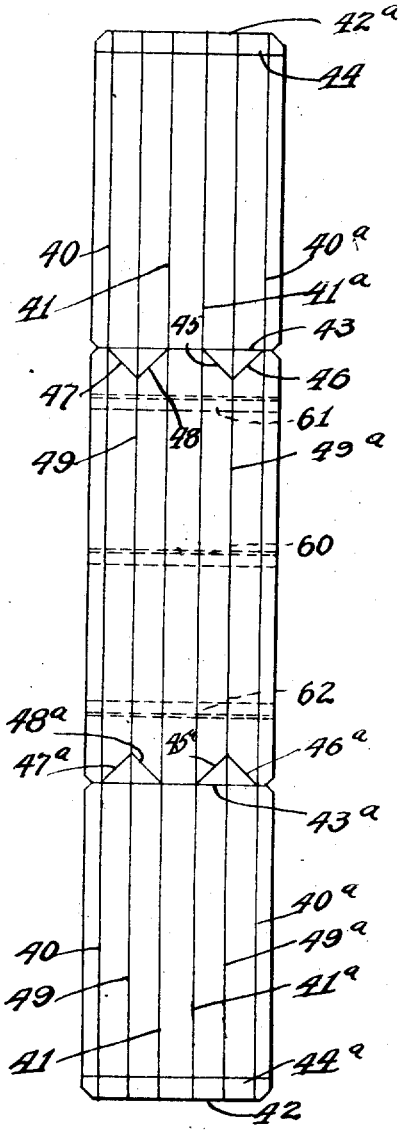
Fig. 13 is a plan of a blank of which the covering of the back of the U-shaped frame F, and the six gussets are integrally formed.

We have hereinbefore mentioned that the blank shown in Fig. 13, has two narrow end portions 42, 42ª. These end portions are doubled upon themselves and cemented together so that the upper edges of the side gussets are formed of two thicknesses of the material of the blank and thus present no raw edges of the material, and at the same time overlap the upper ends of the frame members 30, 31, and the inner linings 55 thereat.

Figure 14:
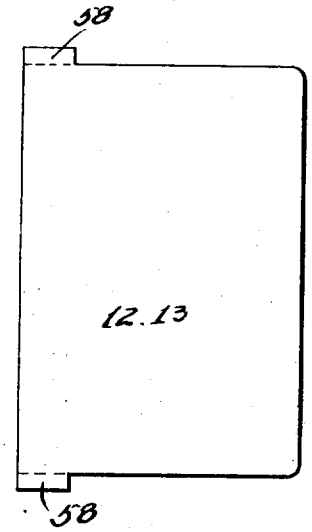
Fig. 14 is a plan of the two partitions in the case, detached therefrom.

In order to strengthen the connection between the vertical edges of the partitions 12, 13, and the gussets, there are formed at the upper corners of these partitions short projections 58, as shown in Figs. 6 and 14, which projections are folded upon the inner sides of the gussets and then cross stitched thereat, as at 59, Fig. 6. By this method of forming the gussets and securing them to the U-shaped frame F, and to the front and back members A, B, we produce a carrying case of superior quality; and in this connection we will here state that all the stitching in this carrying case, instead of being done with cotton or linen thread, may be done with thin, soft, metallic wire, preferably copper or tinned iron, which makes the seams and connections practically indestructible. It is a well-known fact that the stitching in sample and other carrying cases, when done with cotton, or linen thread, sooner or later gives out, the thread wearing rapidly and rotting by moisture, an objection which is entirely obviated by the stitching with metallic thread, which can be successfully used in hand, as well as machine sewing.

While we prefer to make the blank shown in Fig. 13, of a single piece of material, it may also be formed of two halves stitched or cemented, or both, at adjacent ends, as indicated at 60, and also of three pieces, as indicated at 61, 62, a matter which will be obvious to persons skilled in the art to which our invention appertains.

While we have hereinbefore described the preferred embodiment of our invention, we desire it to be understood that we are aware that changes in details of construction may be made, and parts omitted without departing from the scope of our invention as defined in the appended claims.

Having thus fully described this invention, we claim as new, and desire to secure to ourselves by Letters Patent of the United States—

1. A carrying case, including, in combination, a front wall, a rear wall in spaced apart relationship to said front wall, said rear wall having a flexible extension forming a flap or fly to cover a portion of the front wall, a pocket on the outer surface of the rear wall, a fly on said rear wall constructed to overlie said pocket, and tie-straps, said straps being secured at one of their ends to the inside surface of said front wall at the lower part thereof, said straps passing underneath the bottom of said case into said pocket, and means in said pocket for retaining the free ends of said straps in adjusted position.

2. In a carrying case, the combination of a front wall, a rear wall, a compartment on the outer surface of said rear wall, and a series of tie straps, said tie straps being secured at one of their ends to the inner surface of said front wall, the other ends of said tie straps being secured to the other of said walls within said compartment, and means for closing said compartment, whereby the free ends of said tie straps are located in said compartment and hidden from view when said case is closed.

3. In a carrying case, the combination of a front wall, a rear wall, said walls being flexibly connected at their sides and bottom margins to afford a compartment, a pocket at the back of said rear wall, and a multiplicity of tie straps, said tie straps being secured at one of their ends to the lower margin of the front wall, and with their other ends adjustably secured to the back wall within said pocket.

4. A carrying case, including, in combination, a front wall, a rear wall, said front and rear walls being flexibly connected at their side and bottom margins to afford a compartment in said case, a fly secured to the back wall and constructed to overlie the front wall to close said compartment, a pocket at the back of said rear wall, a fly constructed to close said pocket, and a series of tie straps, said tie straps having one of their ends secured to the inner surface of said front wall at the lower margin thereof, said straps passing through said flexible connection at the bottom margins under said flexible connection into said pocket, and means in said pocket for adjustably securing said straps in said pocket, whereby the ends of the straps are hidden from view when said compartment and said pocket are closed.

5. A brief case having walls defining the limits thereof, and means for adjusting said case comprising a member secured to one wall interiorly thereof and passing beneath the brief case and rising adjacent the other wall.

6. A traveling case having adjustable compartments, means for adjusting said compartments comprising members secured interiorly of one outer wall thereof and passing beneath said compartments and extending into said case, and devices interiorly of said case for holding the same in adjusted position.

7. A traveling case having a plurality of walls defining adjustable compartments, a tie strap secured to the inner side of the outer wall of one compartment and passing beneath said case, and rising adjacent a wall of another compartment, and means for adjustably securing said tie strap to a wall of the last mentioned compartment.

In testimony whereof we have hereunto subscribed our names in the presence of two subscribing witnesses.

MAYER AXELMAN.
HARRY W. AXELMAN.

Witnesses:
SPENCER W. GIBBS,
JAMES M. O'BRIEN.